United States Patent [19]
Engle

[11] Patent Number: 5,452,982
[45] Date of Patent: Sep. 26, 1995

[54] SYSTEM FOR POSITIONING AND SUPPORTING TRAILERS ON RAILCARS

[75] Inventor: Thomas H. Engle, Cape Vincent, N.Y.

[73] Assignee: Knorr Brake Holding Corp., Westminster, Md.

[21] Appl. No.: 178,801

[22] Filed: Jan. 7, 1994

Related U.S. Application Data

[60] Continuation-in-part of PCT/LS91/06576, Sep. 12, 1991, which is a continuation-in-part of Ser. No. 581,328, Sep. 12, 1990, Pat. No. 5,112,172.

[51] Int. Cl.⁶ ....................................................... B60P 3/06
[52] U.S. Cl. ............................................. 414/333; 410/59
[58] Field of Search ................................. 414/333, 340, 414/786, 339, 341, 343, 345; 410/58–64; 104/88 F, 88 C; 246/2 F

[56] References Cited

U.S. PATENT DOCUMENTS

| 2,845,878 | 8/1958 | Gutridge et al. |
|---|---|---|
| 2,846,172 | 8/1958 | Gutridge et al. |
| 2,864,321 | 12/1958 | Clejan . |
| 2,903,977 | 9/1959 | Ulinski . |
| 2,916,238 | 12/1959 | Fahland . |
| 3,016,025 | 1/1962 | Clejan . |
| 3,035,801 | 5/1962 | Mangels . |
| 3,180,828 | 4/1965 | Gutridge et al. |
| 3,189,307 | 6/1965 | Peterson . |
| 3,202,390 | 8/1965 | Sherrie et al. |
| 3,236,194 | 2/1966 | Vivian . |
| 3,289,987 | 12/1966 | Candlin, Jr. et al. |
| 3,291,074 | 12/1966 | Remy et al. |
| 3,353,505 | 11/1967 | Rollins et al. |
| 3,358,954 | 12/1967 | Smith et al. |
| 3,362,010 | 1/1968 | Rabinow ................................. 246/2 F |
| 3,381,630 | 5/1968 | Rollins ..................................... 410/64 |
| 3,424,107 | 1/1969 | Rollins . |
| 3,486,467 | 12/1969 | Coulson . |
| 3,552,325 | 1/1971 | Enochian ............................ 410/64 X |
| 3,987,734 | 10/1976 | Horn .................................... 104/88 R |
| 4,239,435 | 12/1980 | Weiss et al. ..................... 104/88 F X |
| 4,407,617 | 10/1983 | Hammonds et al. .................... 410/59 |
| 4,718,800 | 1/1988 | Engle . |
| 4,834,531 | 5/1989 | Ward ........................................ 356/5 |
| 4,868,796 | 9/1989 | Ahrens et al. ............................ 367/96 |
| 5,112,172 | 5/1992 | Engle . |
| 5,215,423 | 6/1993 | Schulte-Hinsken et al. ........... 414/408 |

FOREIGN PATENT DOCUMENTS 1290945  3/1969  Germany .

OTHER PUBLICATIONS

Flat Car for Trailers Brochure, Pullman Standard Co. May, 1955.
Piggy–Back–Scientific Library, Jun. 19, 1958 U.S. Patent Office.

Primary Examiner—Michael S. Huppert
Assistant Examiner—James W. Keenan
Attorney, Agent, or Firm—Barnes & Thornburg

[57] ABSTRACT

In a system for positioning supporting trailers on stanchions of a railroad car, an optical system is provided to allow the operator to monitor the relationship of the tractor, trailer, stanchion and actuators on the tractor. The unique system of stanchion position indicia is provided to allow rapid and accurate selection of the stanchion position. The tractor includes a positively controlled actuator for operating the breakdown trigger of the stanchion to unlock it.

12 Claims, 14 Drawing Sheets

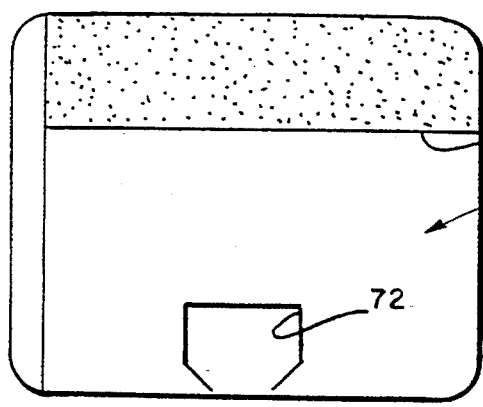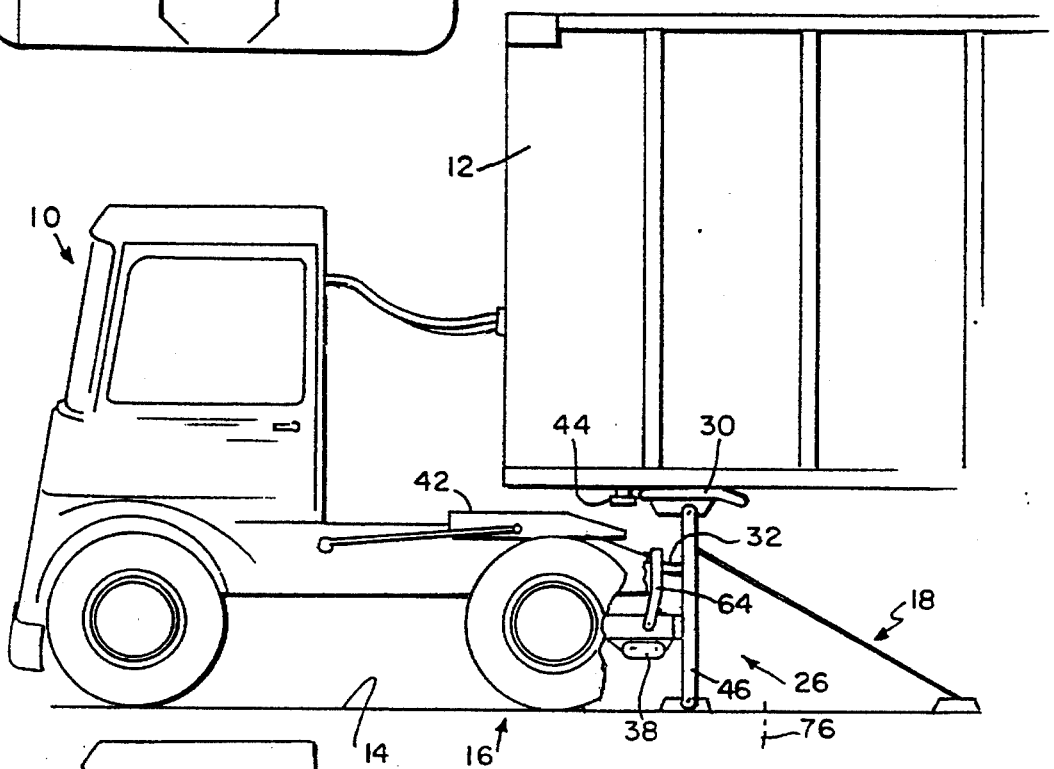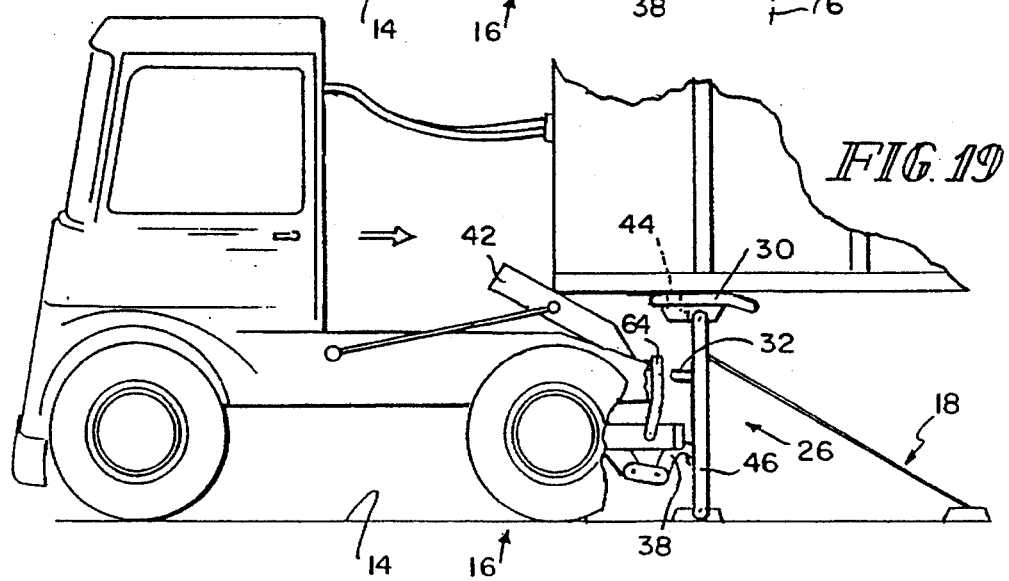

SYSTEM FOR POSITIONING AND SUPPORTING TRAILERS ON RAILCARS

CROSS-REFERENCE

This a continuation-in-part of PCT/US 91/06576 filed Sep. 12, 1991 which is a continuation-in-part of Ser. No. 581,328, filed Sep. 12, 1990, now U.S. Pat. No. 5,112,172.

TECHNICAL FIELD

The present invention relates generally to supporting trailers on railroad cars and more specifically to an improved systems for positioning and supporting trailers on railroad cars.

BACKGROUND ART

It is well known to transport trailers of trucks on railroad cars, namely, flat bed railroad cars. Some designs have used specialized structure railroad cars and adapters for the landing gear of semi-trailer trucks as illustrated in U.S. Pat. No. 2,864,321. Others have provided stands for the king pin of the trailer which ride along a pair of slots in the surface of the railroad car, and generally include a manually actuated mechanism to hold the stand in place on the car after adjustment. Examples of these structures are shown in U.S. Pat. Nos. 2,845,878; 2,846,172 and 2,903,977.

Collapsible fifth wheel stands have also been installed at one end of a flat bed and arranged to be raised by a chain or hook pulled by a truck tractor beneath a parked trailer to secure it to the railroad car. This is shown in U.S. Pat. Nos. 3,016,025, 3,202,390 and 3,236,194. Examples of stationary, collapsible fifth wheel stands which are raised or lowered by spring, screws or hydraulic include U.S. Pat. Nos. 3,180,282; 3,189,307; 3,291,074 and 3,289,987.

A self-propelled stanchion which can be positioned along the surface of the railroad car and raised and lowered using internal or external motors is described in my U.S. Pat. No. 4,718,800. But its operation was independent of the trailer positioning.

All of the systems of the prior art have advantages and disadvantages. Those which use specialized car design are not usable to transport other types of freight. Those which have an erect stand are not storable and require the removal of unused stands at one location and a supply at the unloading location if there is further loading to be performed. Some of the collapsible stands are not adjustable along the surface of the flat bed and, thus, do not allow for optimum placement of the maximum number of trailers on a train system. The positioning and securing of the stanchions require special equipment or more than one operator or plural steps in addition to positioning, connecting and disconnecting the trailer.

Thus, it is an object of the present invention to provide a system which allows the operator to readily select the position of a stanchion for a trailer and secure the stanchion thereto.

Another object of the present invention is to provide a system which reduces the number of steps and personnel needed in loading, securing, unsecuring and unloading a trailer on and from a railroad car.

Still another object of the present invention is to provide a system wherein the stanchion is repositioned and operated from the tractor which positions the trailer.

A further object of the present invention is to provide a system wherein the operator, from the cabin of the tractor, can monitor the relationship of the tractor, the trailer, the stanchion and actuators on the tractor which interacts with the stanchion.

These and other objects of the invention are obtained by providing an optical system on the tractor which allows the operator in the cab of the tractor to monitor the relationship of the tractor, trailer, stanchion and actuator which interact with and control the position of the stanchion. The optical system preferably is a screen in the cabin and a camera providing images for the screen. Other optical devices including mirrors may be used. A train, including a plurality of cars with one or more stanchions mounted either permanently or movably thereon, has stanchion position indicia provided either on the stanchion for a stationery stanchion or on the deck of the car for a movable stanchion. The indicia indicate the position from a reference point on the train. In combination with the optical system, this allows the operator to select an appropriate stanchion, to which the trailer can be secured from the cab without further assistance. The indicium of the next stanchion position is determined as a function of the indicium of the last stanchion position to which previously loaded trailer is secured, and the length of the trailer to be loaded. This may be done by the operator using an onboard computer or from a chart which will indicate the positions of the indicia after the operator has added the previous stanchion position indicia to the length of the trailer plus a minimum spacing factor.

The stanchion includes a lock for locking the stanchion in the raised position and trigger for unlocking the lock. An actuator is provided on the tractor having a safe position which does not engage the trigger when the tractor is adjacent to the stanchion and an unlocking position which does actuate the trigger when the tractor is adjacent to the stanchion. Thus, the safe position is forward of a rear bumper on the tractor and the unlocking position is out or beyond this bumper. The actuator may also be pivotally connected to the bumper. The bumper may be essentially split into a pair of bumpers with a hook there between. The optical system allows the operator in the cab to monitor the condition of the trigger on the hitch so that he can assure that a trailer is only secured to a raised and locked stanchion before driving out from under the trailer. The tractor also includes a hook for engaging the stanchion and raising it. The optical system allows the operator in the cabin to monitor the position of the hook with respect to a receiver on the stanchion. Also, the stanchion may be provided with indicium, spaced from the receiver, for indicating the minimum in spacing from the receiver at which the hook should be moved from its disengaged or engaged position. The optical system allows placing the tractor and trailer at the appropriate point such that the hook is behind the indicium.

Thus, the unique stanchion and the unique equipment on the tractor allows the selection of the appropriate stanchion position during loading and controlling and monitoring the position and condition of the stanchion and elements on the tractor and trailer during loading and unloading. Similarly, all the operations, in selecting and controlling the stanchion are performed from the tractor, thereby reducing the amount of time, the number of steps and the number of people involved in the loading and unloading of the trailer and the positioning and repositioning of the stanchion. While improving safety both by giving the driver better control of his operations, and eliminating ground personnel who are otherwise subject to tripping hazards or being struck by moving equipment Other objects, advantages and novel features of the present invention will become apparent from the following detailed description of the invention when considered in conjunction with the accompanying drawings.

BRIEF DESCRIPTION OF THE DRAWINGS

FIGS. 14 through 19 are schematic representations of the system and the corresponding monitor view illustrating a method of loading a trailer on the rail car having fixed stanchions according to the principles of the present invention.

DISCLOSURE OF THE INVENTION

Figure 1:
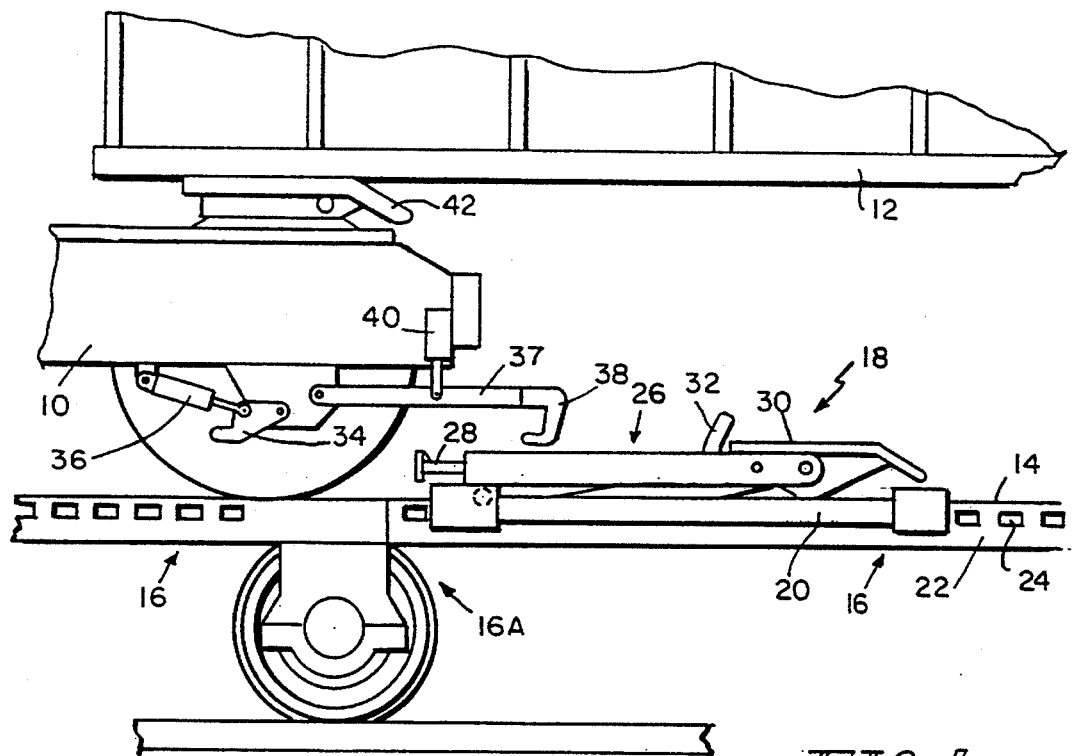
FIGS. 1–5 are schematic representations illustrating a method of loading a trailer on a railroad car having movable stanchions according to the principles of the present invention.

The present system as illustrated in FIGS. 1–9 includes a tractor 10 connected to or to be connected to a trailer 12, which is to be positioned along a surface 14 of railroad cars 16. A stanchion 18 is mounted on the railroad car 16 to support the trailer 12 and secure it to the railroad car 16. The stanchion 18 includes a slide frame 20 which slides along a rail 22 in the individual cars 16 and a stand 26 pivotally mounted to the slide 20. The rails 22 include a plurality of apertures 24 to receive a latch mechanism which is released by external force applied to plunger 28. A fifth wheel connection 30 is on the stand 26, as is the standard release mechanism 32. A pair of cars 16 are shown with the stanchion 18 at one end of the car frame 16A of the right car. The details of the latch mechanism and the stanchion 18 are described in the parent applications and are incorporated herein by reference.

The tractor 10 is shown with the closest wheel removed to expose the additional mechanism applied thereto according to the present invention. A gate 34 which applies external force to the plunger 28 of the latch mechanism of the stanchion 18 is pivotally mounted to tractor 10 and is controlled by fluid device or motor 36. In FIG. 1, the gate 34 is shown in its raised or locking position, and in FIG. 2 in its lowered unlocking or position. Also pivotally mounted to the tractor 10 is a hook 38 controlled by fluid device or motor 40 to be in its raised or unhooking position of FIG. 1, or its lower and hooking position of FIG. 2. The tractor 10 also includes a fifth wheel connection 42 to receive the king pin 44 of the trailer shown in FIG. 4.

The loading process begins, as illustrated in FIG. 1, with the stanchion 18 at one end 16A of a car 16 and the plunger 28 extended under spring biasing such that the latch mechanism is in its locked position. Trailer 12 is backed onto the car 16 by a tractor 10. The gate 34 is up in its locking position and the hook 38 is also up in its unhooking position. Trailer 12 is backed onto the decks of the cars 16 and over the dropped or lowered stanchions 18 until the platform on which the desired stanchion is located is reached.

Figure 2:
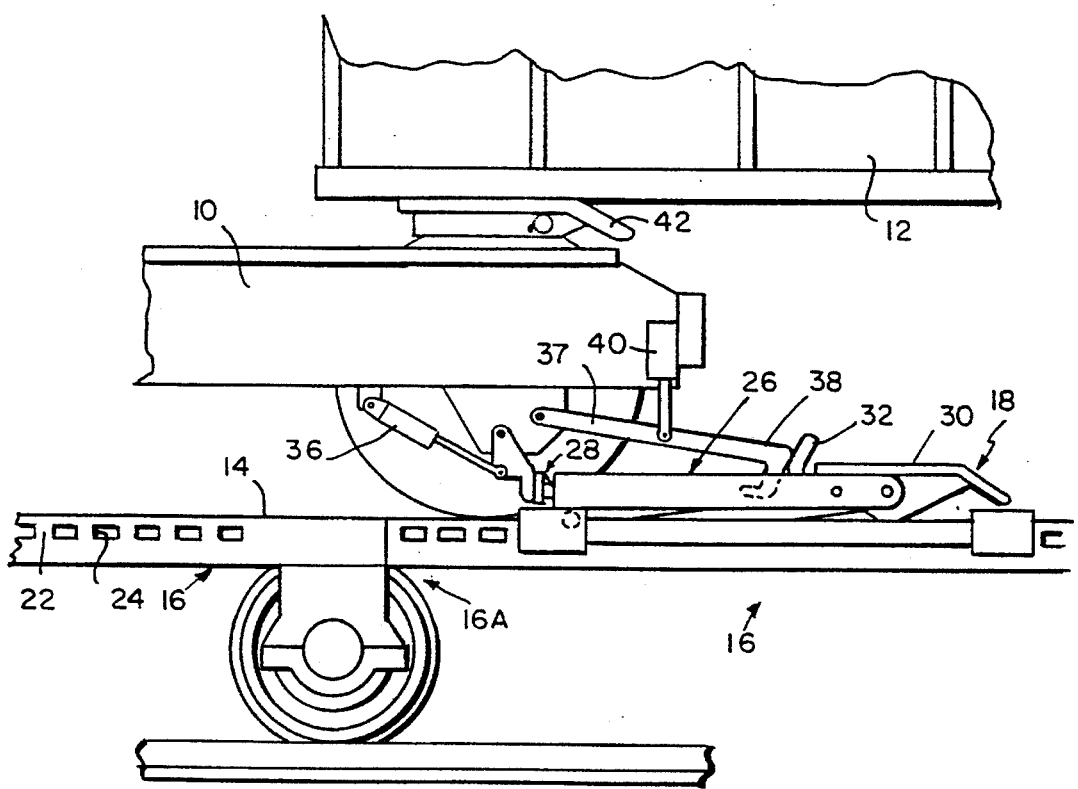

Upon approaching the desired stanchion 18, the operator lowers the gate 34 by fluid motor 36 to its down position as illustrated in FIG. 2. The tractor 10 continues to back up the trailer 12 until the gate 34 engages the plunger 28, overcoming the spring bias of the latch and unlocking the stanchion 18. The continued rearward movement of the tractor 10 moves the trailer 12 and repositions the stanchion 18 through force applied by gate 34 to the desired location along the deck 14 of the car 16. The operator also lowers the hook 38 using fluid motor 40 in preparation for later use.

To further assure that the latch mechanism will unlatch or unlock the stanchion 18, the lowered hook 38 is caused to lie in an opening in the frame of the stand 26 which includes a bar. Forward movement of the hook relative to the stanchion will cause the hook 38 to engage the bar. This may be by hydraulics or by forward movement of the tractor 10. Once hook 38 engages the stanchion, the gate 34 is lowered to engage the plunger 28 and drive it back against the spring bias to unlock the latch. Thus the stanchion 18 and the plunger 28 are secured between the hook 38 and the gate 34. This not only assures unlatching or unlocking of the stanchion 18, but maintains this unlatched position for either direction of travel of the tractor 10. The distance between the hook 38 and the lowered gate 34 is selected to be substantially equal to the distance between the bar on the stand 26 and the contracted plunger 28.

Figure 3:
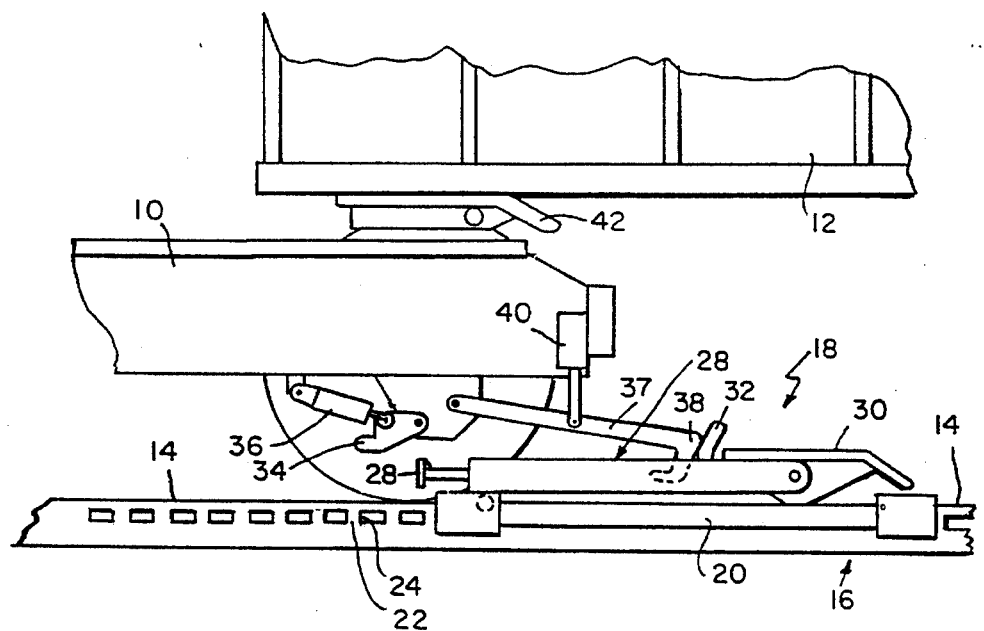

When the desired position on the surface 14 of car 16 is reached as indicated by indices on the car and the previously mentioned calculation, the operator raises gate 34 from its lowered or unlocking position to its raised position or locking position. Plunger 28 is then extended and the stanchion 18 is latched or locked into place at a specific position along the surface 14 of car 16. The extended plunger 28 is illustrated in FIG. 3. The operator then retract the hook, positions the trailer sets the trailer brakes, releases the king pin 44 from the fifth wheel connection 42, and moves the tractor forward re-engaging the hook into the opening in the hitch.

Figure 4:
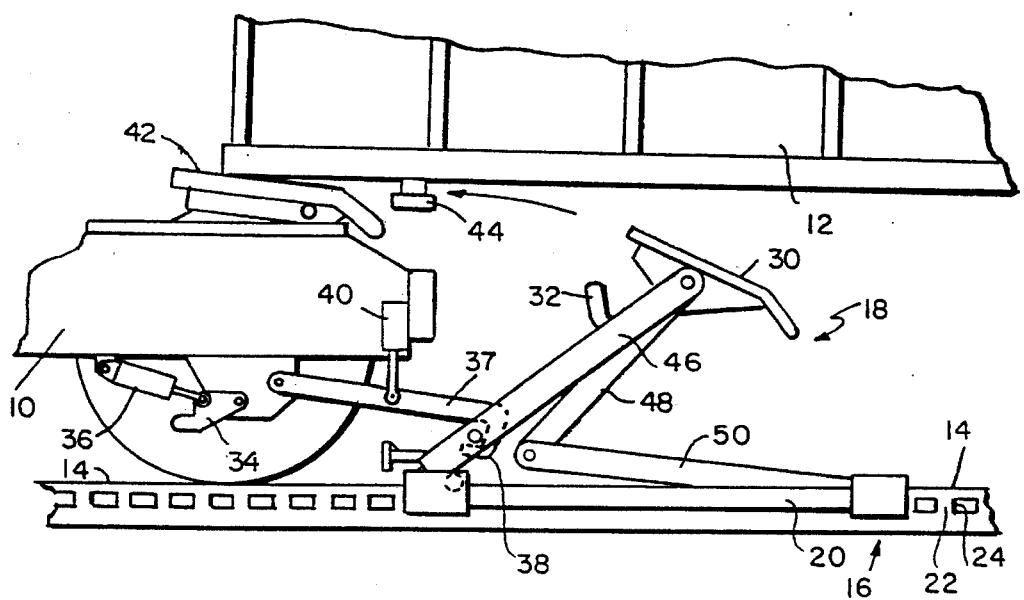

Since the hook 38 lies in an opening in the frame of the stand 26 which includes a bar, and the stanchion 18 is latched or locked to the rail 22, the forward movement of the tractor 10 causes the hook 38 to engage the bar and raises the stand 24. The king pin 44 of the trailer 12 slides out of the tractor fifth wheel connection 42 as illustrated in FIG. 4. As the tractor 10 continues to move forward, the fixed trailer 12 begins to shift from the fifth wheel connection 42 of the tractor 10 to the stanchion 18 fifth wheel connection 30. The fifth wheel connection 30 of the stanchion continues forward relative to the trailer 12 as a result of the pivoting of the stand 26. The hook adjustment is such that the release trigger 32 is not depressed at the full up position unless the tractor 10 is backed up by the operator and the knockdown block is in its knockdown position.

Figure 5:
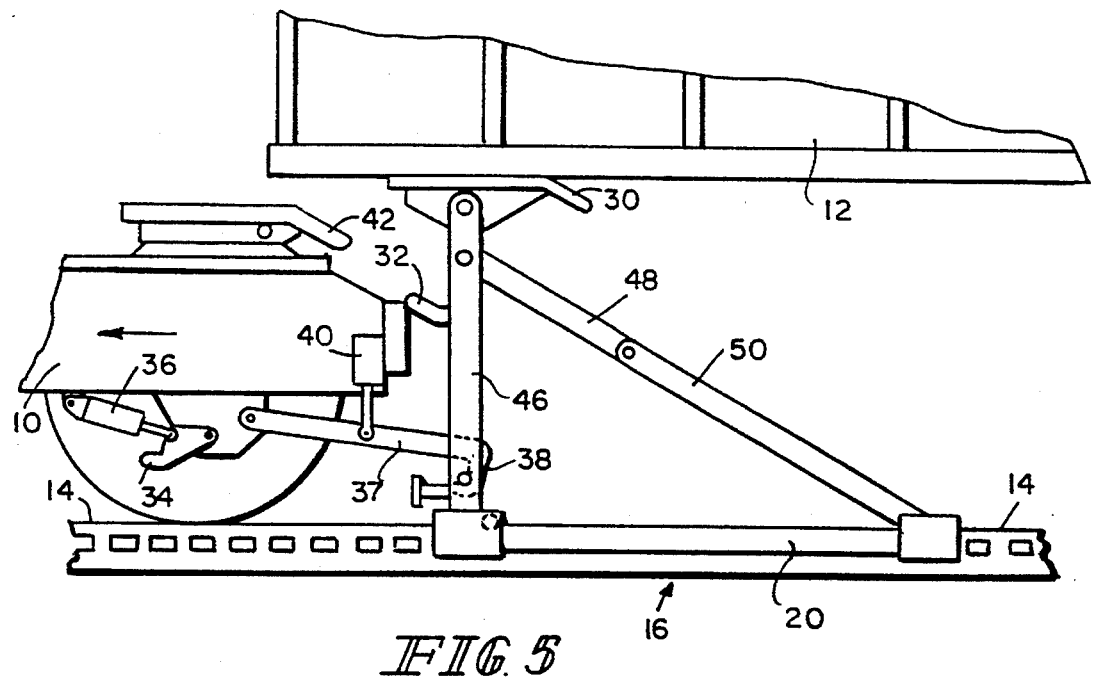

With continued forward movement of the tractor 10, as illustrated in FIG. 5, all the weight of the trailer 10 is now on the upright stanchion 26. Vertical member 46 is upright and the diagonal brace members 48 and 50 are locked to each other. The operator on the tractor 10 then raises the hook 38, disengaging it from the vertical member 46. To be certain that the king pin 42 of the trailer 12 is engaged by the fifth wheel connection 30 of the stanchion, the tractor is pulled forward and its fifth wheel connection 42 is raised. Tractor 10 is then backed against trailer 12 to push the king pin 44 home into the fifth wheel connection 30 of the stanchion 18. This completes the loading and securing of the trailer 12 to the car 16.

Figure 6:
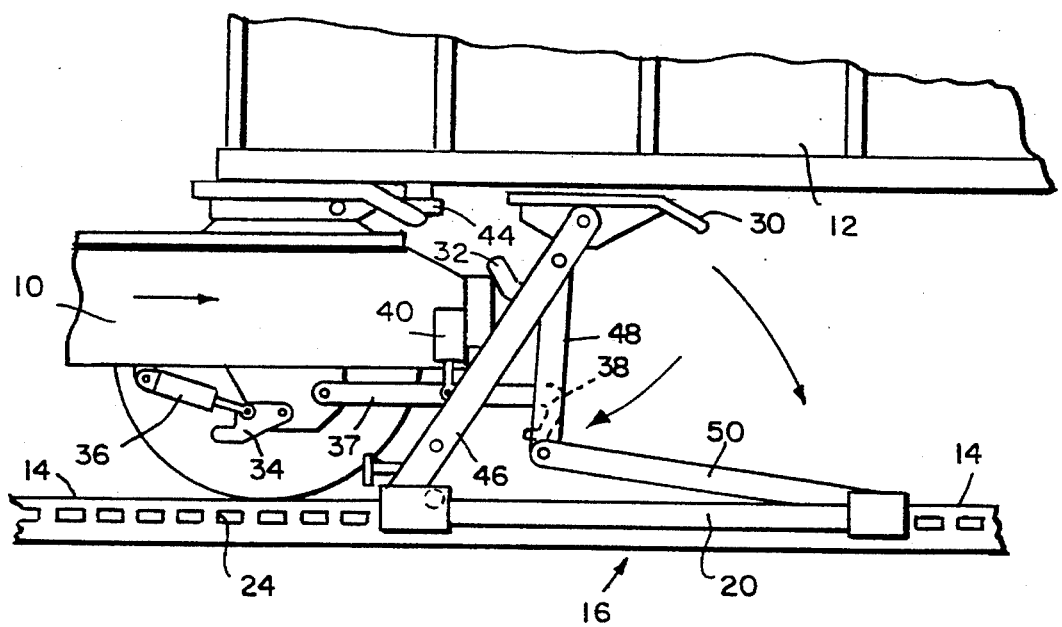
FIGS. 6–9 are schematic representations of the method of unloading a trailer from a railroad car having movable stanchions according to the principles of the present invention.
Figure 7:
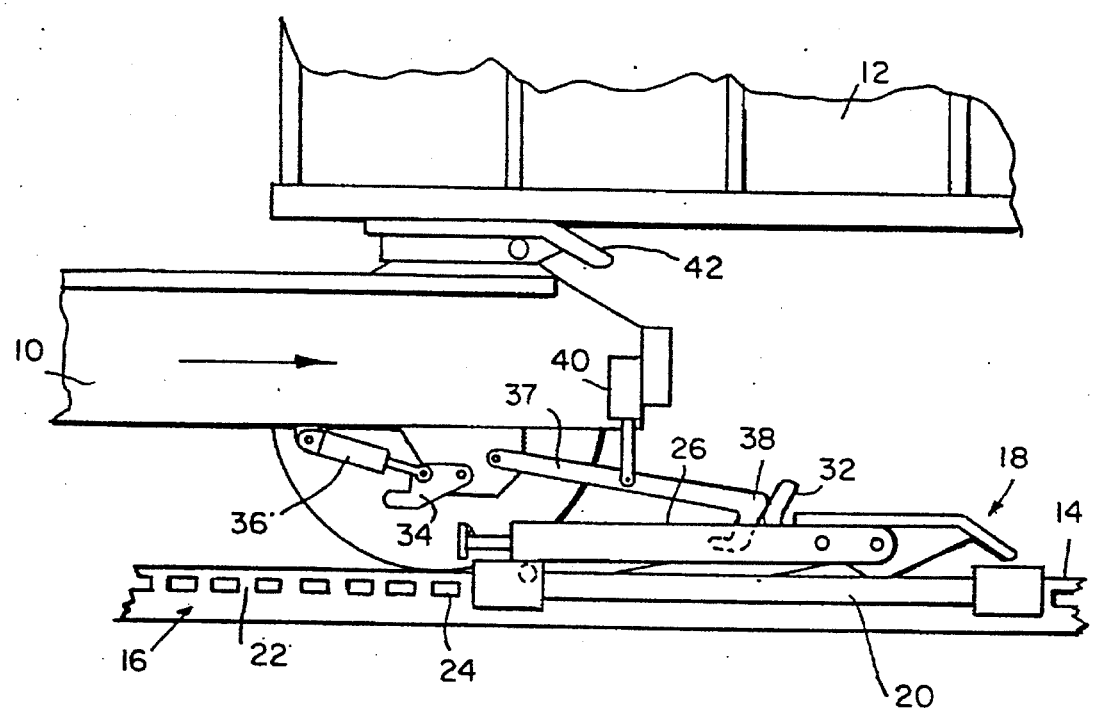

The unloading operation begins by backing up the tractor 10 until it is adjacent to the stanchion 18 and under the trailer 12. As the back of the tractor 10 engages trigger 32, it depresses it, releasing both the diagonal brace members 48 and 50 and the trailer king pin 44 and fifth wheels 30 latch. With this continued movement as illustrated in FIG. 6, the stanchion 18 collapses with the weight shifting from the fifth wheel connection 30 of the stanchion 18 to the fifth wheel connection 42 of the tractor 10. The latch mechanism of the stanchion 18 is in its locked position, allowing this to occur. Similarly, the gate 34 and the hook 38 on the tractor 10 are in their raised positions. Tractor 10 continues backwards, and the trailer king pin 44 couples to the tractor fifth wheel connection 42 of the tractor 10. The driver then connects the brake hoses of the tractor 10 to the trailer 12 and releases the trailer brakes. Stanchion 18 is in its completely clasped position as illustrated in FIG. 7.

Figure 8:
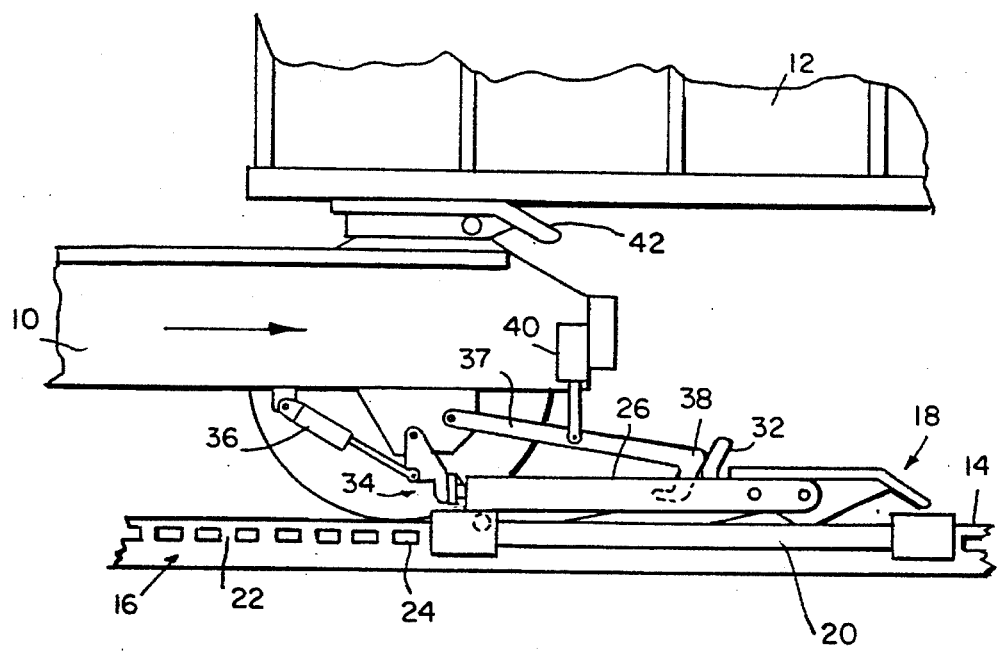
Figure 9:
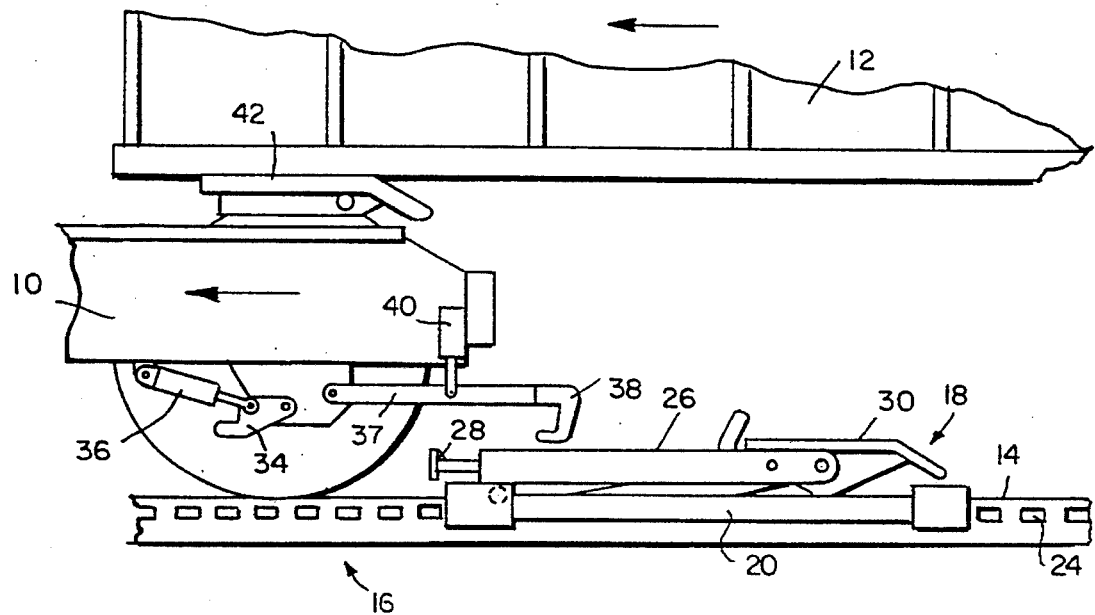

To reposition the stanchion 18 at the front end 16A of car 16, the operator activates fluid motor 40 to drop the hook 38 to its lowered position checking on his screen to be certain that hood 38 is in the opening 12 to hook the stanchion 18. This is illustrated in FIG. 7. Next, the operator activates the fluid motor 36 to lower the gate 34 to depress the plunger 28 to unlock the latch mechanism of the stanchion 18. With the plunger 8 and stanchion 18 secure between hook 38 and gate 34 the collapsed stanchion 18 can move either forward or backward with the trailer 12 and the tractor 10 when it moves forward along the deck as illustrated in FIG. 8. At the end of the deck 16A, the operator raises the hook 38 using fluid motor 40 and rotates the gate 34 up using fluid motor 36. The latch mechanism being biased, will then move to its locked position locking the stanchion 18 to the railroad car 16. This allows the tractor 10 and trailer 12 to move off the railroad car, while leaving the stanchion 18 properly positioned for loading as illustrated in FIG. 9.

Figure 10:
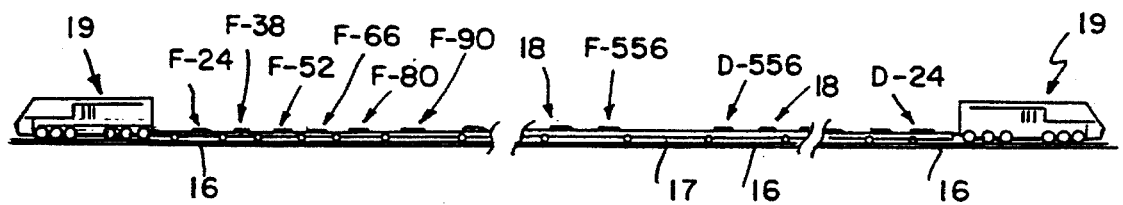
FIG. 10 is a schematic representation of a split ramp car in an articulated train showing the unique stanchion position indicia according to the principles of the present invention.

To aid the operator in positioning the stanchion 18 along the car 16, the present system provides indicia of stanchion positions measured from a point on the train. The train is illustrated in FIG. 10 as including the plurality of interconnected cars 16, and a control module 19 at each end thereof. In the center of the train is a split ramp car 17 which allows the train to be split in half and trailer to be loaded on each half. As illustrated in the FIG. 10, left half has been given the notation F and right half has been given notation D. Each car 16 may have one or more stanchions 18 thereon.

By way of example, the present system will be described with respect to indicia markings spaced at 14 feet. Using a typical 28 foot car, each car will include two 14 foot indicia except for the car closest to the control module 19 which includes one indicia of 24 feet. The point to which the indicia are referenced is to the juncture of the first car to the control module 19. The indicia indicates the location of the kingpin 44 of the trailer on the stanchion 18. Thus, the first stanchion location of the kingpin would be 24 feet on the control module 19. Thus, it can only be used for short container chassis. The example shown on FIG. 10, the next stanchion position indicia would be 38 etc. up to a final position of 556.

The system of FIG. 10 will be explained with respect to stanchions 18 being fixed to the car at the indicia locations. Thus, the operator would select a specific stanchion by its numbered location. To determine the stanchion to be used, the operator must know only two things, a) the indicium of the previous used stanchion and b) the length of the trailer being loaded. The sum of these two numbers plus a minimum spacing factor will produce a number which will be called the stanchion index. Five feet has been considered an appropriate minimum distance. Thus, the stanchion index will be found by the following formula:

$$N=n+L+5$$

Where

N=the stanchion index, n= the number of the last stanchion used, and and L=the length of the trailer to be placed When the stanchion index is thus determined, the driver only has to select the next greater stanchion number from a list giving the actual numbers of the stanchions. For example, if the last stanchion used were F-248 and a 45-foot trailer were to be loaded next, then n=248, L=45 and the stanchion index would be:

$$N=248+45+5=298.$$

From the stanchion list below, it can be seen that the first stanchion number equal to or greater than the index N=298 above, is stanchion 304.

| STANCHION LIST (14' stanchion spacing) | | | | | | | |
|---|---|---|---|---|---|---|---|
| 24 | 94 | 164 | 234 | 304 | 374 | 444 | 514 |
| 38 | 108 | 178 | 248 | 318 | 388 | 458 | 528 |
| 52 | 122 | 192 | 262 | 332 | 402 | 472 | 542 |
| 66 | 136 | 206 | 276 | 346 | 416 | 486 | 556 |
| 80 | 150 | 220 | 290 | 360 | 430 | 500 | |

This calculation could either be made by hand, as in this example, or be done using a simple programmable calculator containing both the stanchion list and the index formula in its memory. In either case, as the driver backs over the deck of the cars, he can read the stanchion numbers off of targets in the cab on a TV monitor to be described below. When the driver sees number 304, he positions the tractor 10, pulls up the stanchion 18, and transfers the kingpin 44 from the tractor 10 to the stanchion 18.

Preferably with the fixed stanchions, the indicia or numbers are on the stanchion. Alternatively, they may be on the car deck itself. For movable stanchions, as in FIGS. 1–9, indicia numbers will be on the car deck. Although the example given uses fixed intervals of 14 feet, the fixed intervals can be any length, or the intervals may not be evenly distributed and may vary. This is not only true for the fixed stanchion embodiment, but also for the movable stanchion embodiment.

Figure 11:
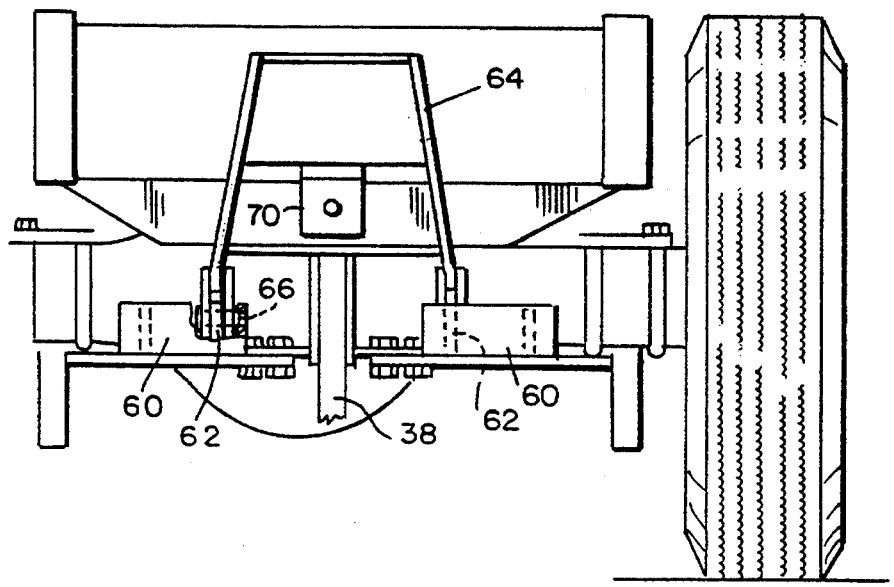
FIG. 11 is a rear view of a tractor incorporating a trigger actuator and camera according to the principles of the present invention.
Figure 12:
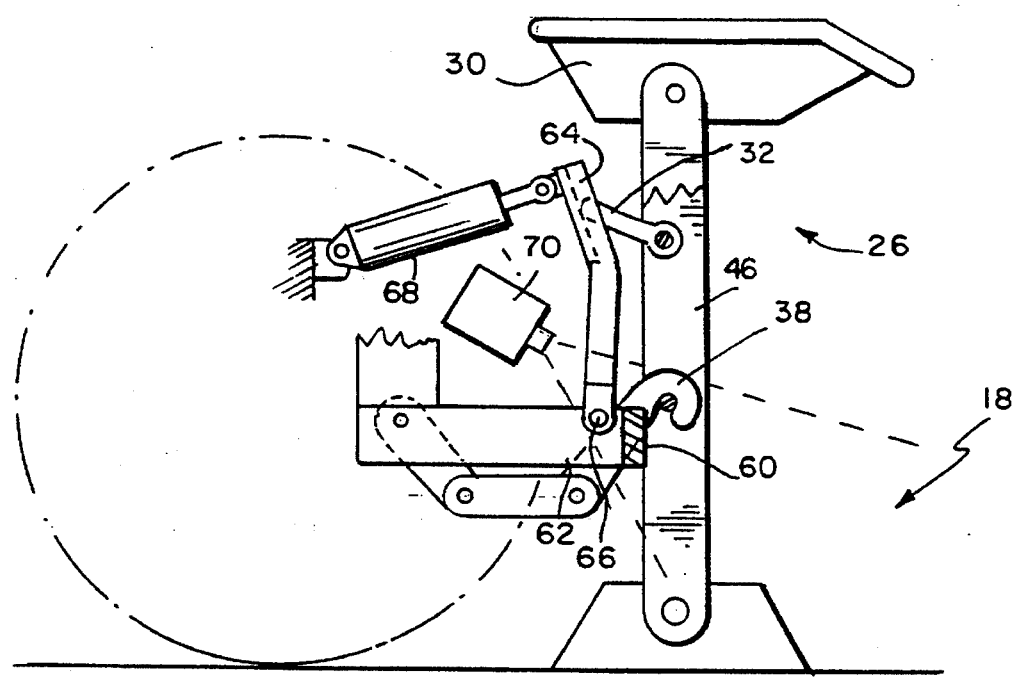
FIG. 12 is a side view of FIG. 11 with the actuator in its safe position.
Figure 13:
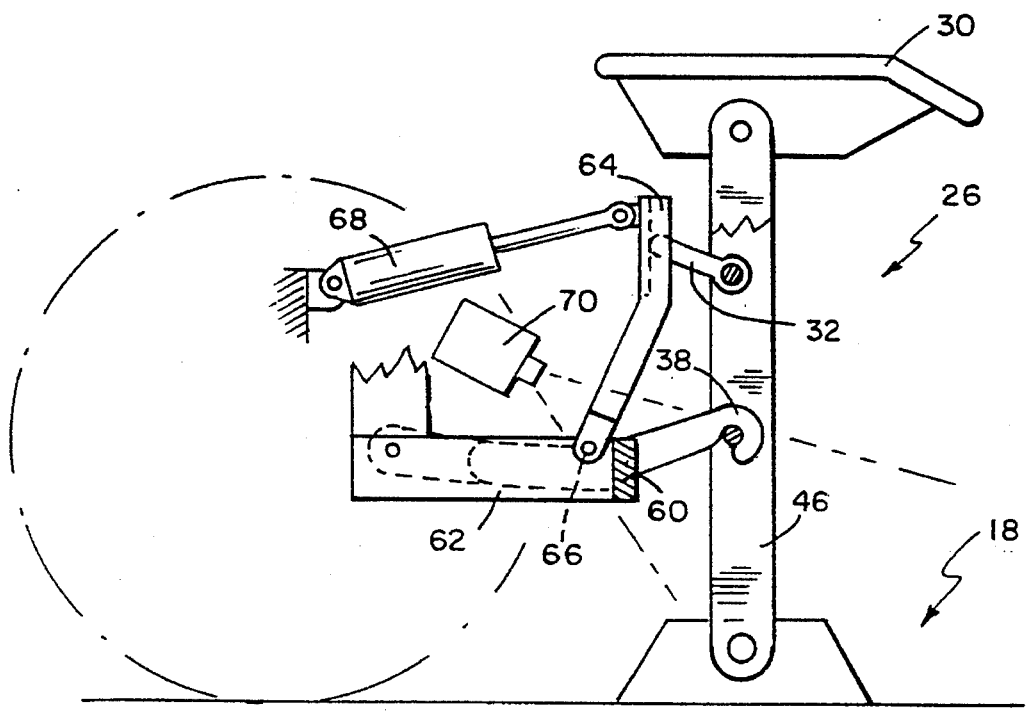
FIG. 13 is a side view of FIG. 11 with the trigger actuator in its unlocking or knockdown position.

In addition to the hook 38 and gate 34 of FIGS. 1–7 and their actuators, tractor 10 may be provided with a trigger actuator or knockdown block, bumpers and a TV system as illustrated in FIGS. 11 through 13. A pair of spaced bumpers 60 are mounted to the truck frame by braces 62. A trigger actuator 64 to actuate the trigger 32 on stand 26 of the stanchion 18 is pivotally mounted to the brace 62 by pin 66. A fluid motor 68 controls the position of the trigger actuator 64. Also mounted to the frame of tractor 10 is a television camera 70. The camera 70 may be fixed or may be steerable, depending upon the number of elements and the areas to be viewed on a monitor in the cab. As noted in FIG. 11, the hook 38 is positioned between the bumpers 60.

The trigger actuator 64 is recessed behind the bumper 60 in its safe position as illustrated in FIG. 12. Thus, when the tractor 10 is backed up such that the bumpers 60 engage the upright 46 of the stand 26, the trigger actuator 64 will not engage the trigger 32 of the stand 26. Thus, the stand 26 will not be unlocked. When the trigger actuator 64 is moved from its safe to its unlocking or knockdown position by fluid motor 68 as illustrated in FIG. 13, the trigger actuator 64 is at or beyond the bumper 60. In this position, the trigger actuator 64 will engage trigger 32 before bumper 60 engages the upright 46 of the stand 26. With further rearward movement, the trigger actuator 64 depresses trigger 32 to unlock the stand 26 such that it can collapse when engaged by the bumper 60.

Figure 14B:
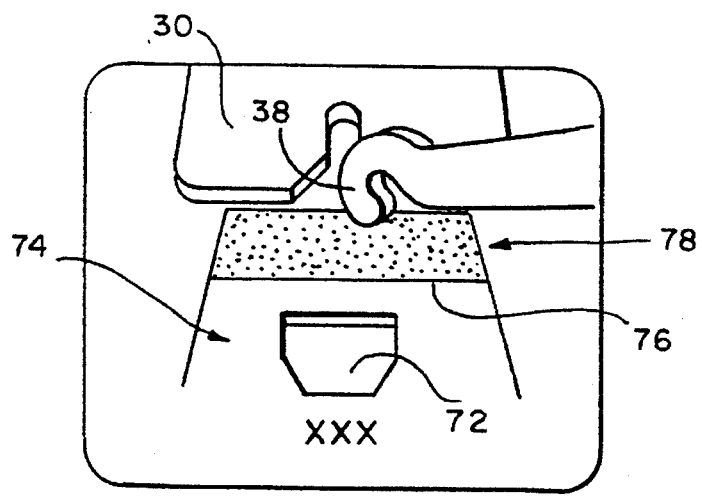

The loading process will be described with respect to FIGS. 14 through 19. The view seen by the operator produced by the optical system will be illustrated on the screens of FIGS. 14B through 18B and 17C. In addition to the modification for the tractor described in FIGS. 11 through 13, the stand 26 has also been modified as illustrated in FIG. 14B. A face plate 74 attached to the vertical strut 46 of the stand includes a receiver opening 72 for receiving the hook 38. A pick-up line 76 is provided on the hitch spaced from the receiver opening 72 and has a painted area 78 there behind to help define the position of the line on the TV monitor. The stanchion position, for the fixed stanchion example of FIGS. 14 through 19, is provided on its face plate 74 below the receiver opening 72 and is represented by XXX. Alternatively, a position indicium may be provided anywhere on the stanchion 18 such that the operator, through the camera 70 can view the indicia of the position of the stanchion as soon as possible while approaching the stanchion.

Figure 14A:
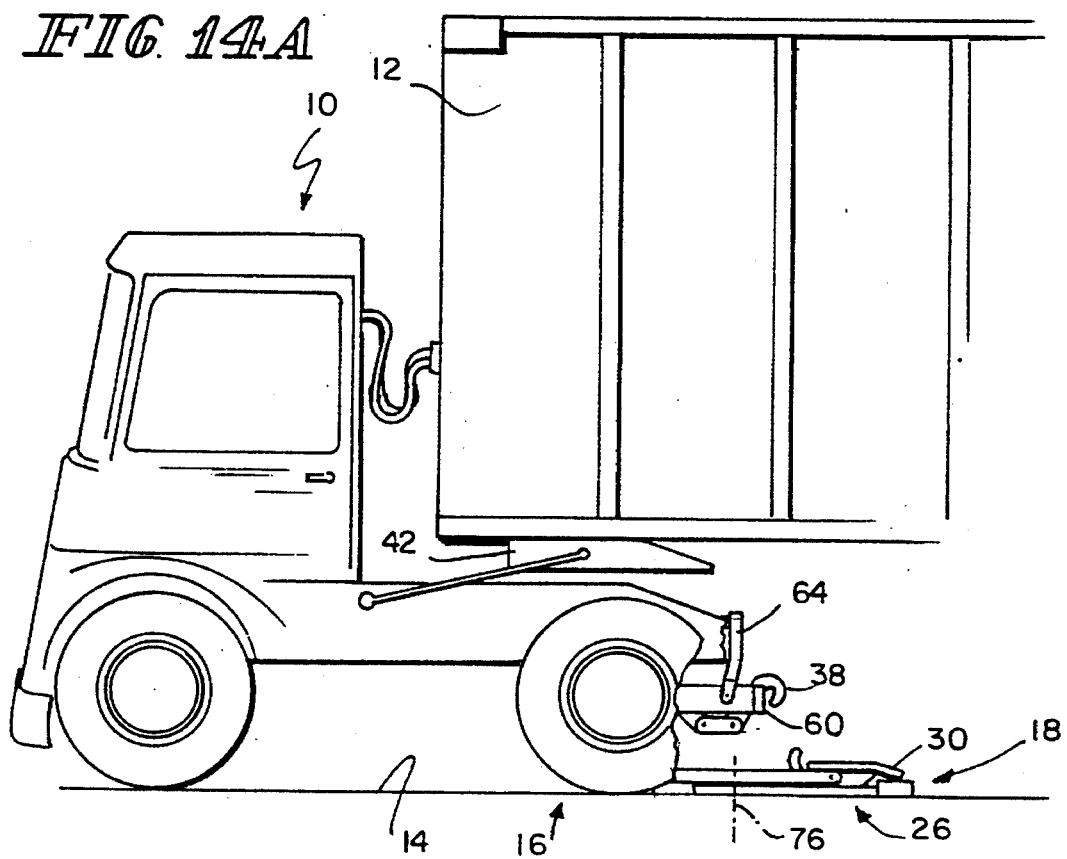
Figure 15B:
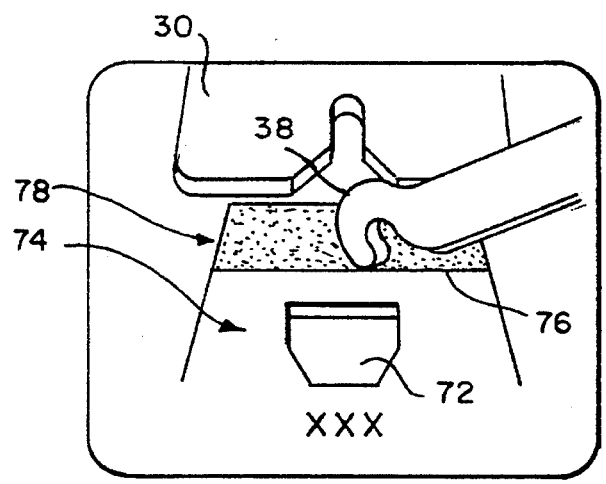
Figure 15A:
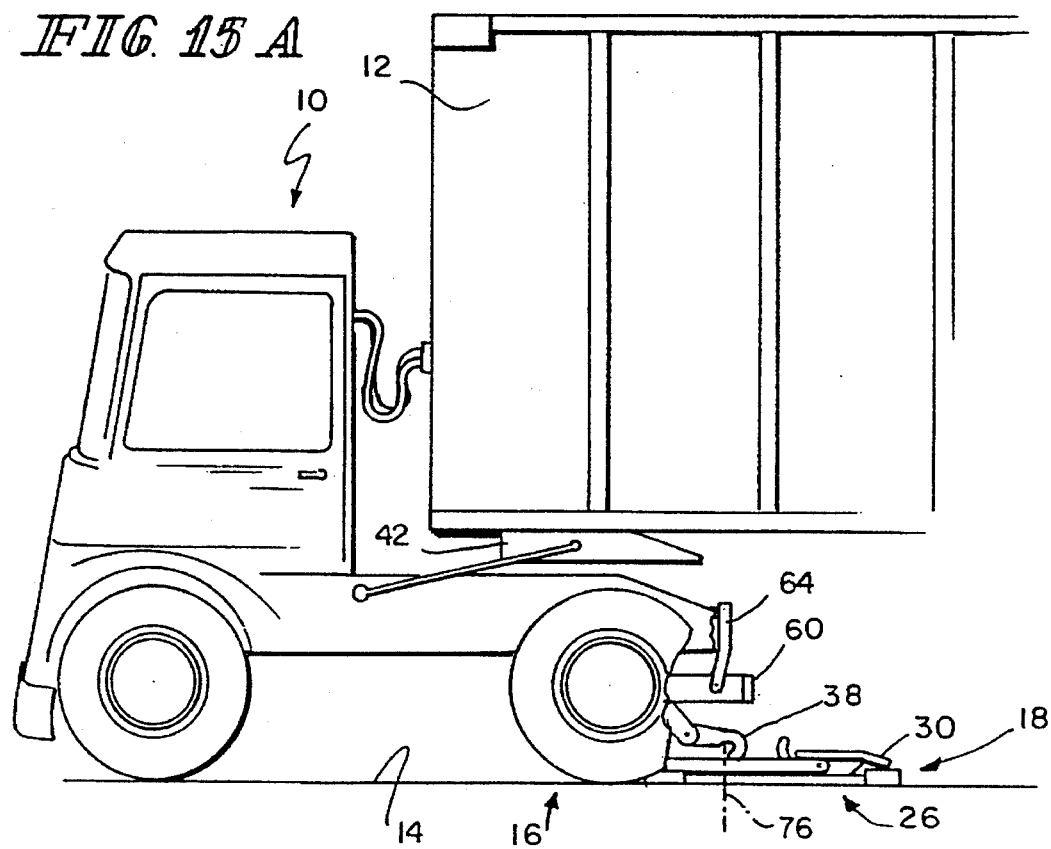
Figure 16B:
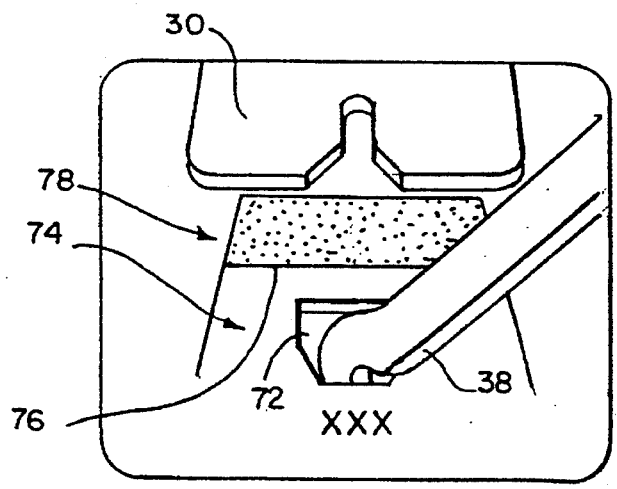
Figure 16A:
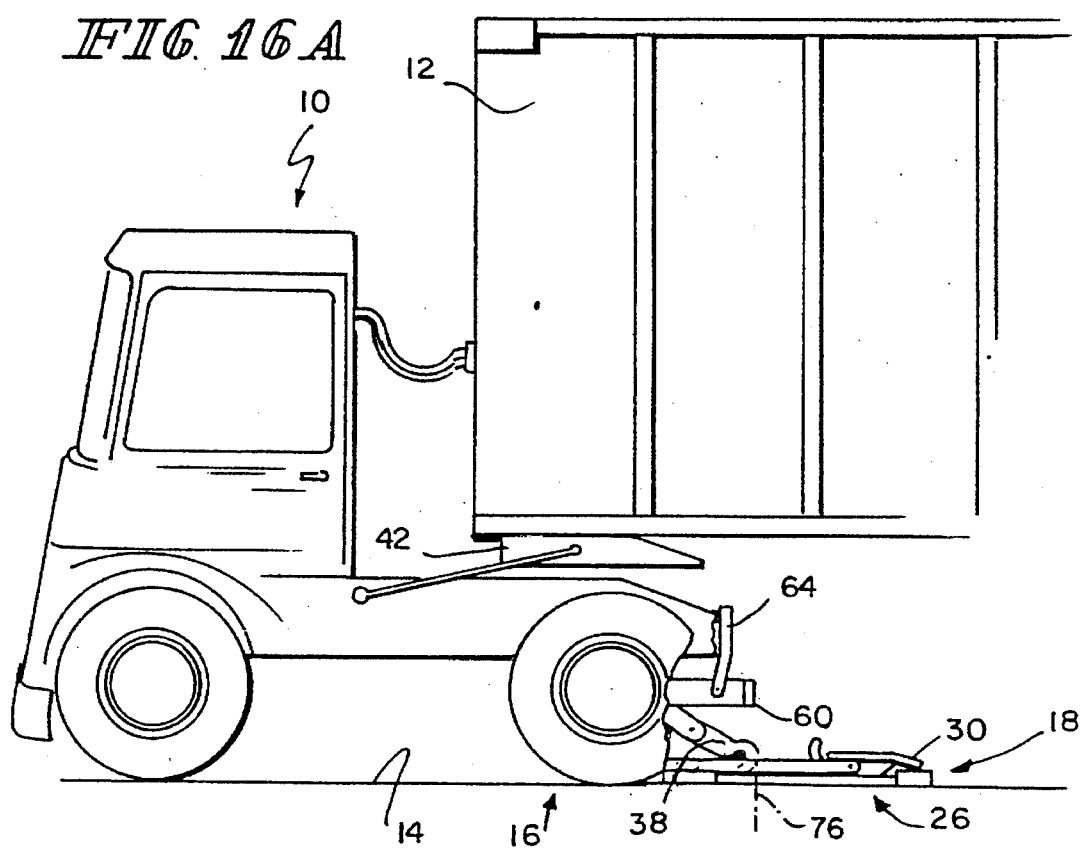

The process begins with the driver backing the trailer along the car 16. Care must be taken that the trigger actuator 64 is in its safe position and the hook 38 is also retracted. The driver backs the trailer to the selected stanchion 18 stopping at a position where he can drop the hook 38 onto the face plate 74 of the vertical strut 40 behind the pickup line 76 as shown in FIGS. 14A and B. The driver next pulls forward slowly moving the trailer 12 until the lip of the hook 38, as seen on the monitor, is exactly on the pickup line 26 as shown in FIG. 15A and B. At this point, the driver sets the trailer brakes, releases the kingpin 44 and pulls slowly forward dragging the hook 37 over the face plate 74 of the vertical strut until the hook 38 drops into the receiver opening 72 and catches on the bottom of that opening as shown in FIG. 16 A and B.

As the tractor 10 is moving from the point of the pickup line 76 forward, the trailer 12 is not moving. The trailer's fifth wheel 42 is thus moving toward the front of the trailer 12, making room for the top plate 30 of the stanchion 18. Failure of this tractor motion to erect the stanchion 18 would allow the trailer 12 to be dropped onto its landing gear if the tractor 10 pulled out from beneath the trailer 12. It is thus of utmost importance that the proper engagement of the hook 38 into the receiver opening 72 be observed by the driver.

Figure 17B:
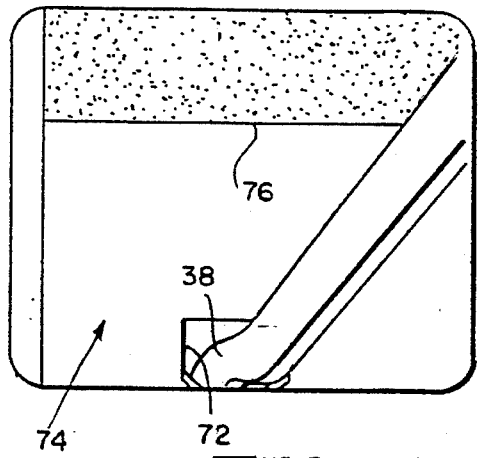
Figure 17C:
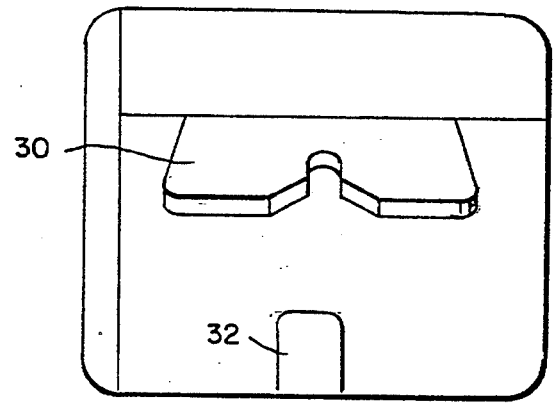
Figure 17A:
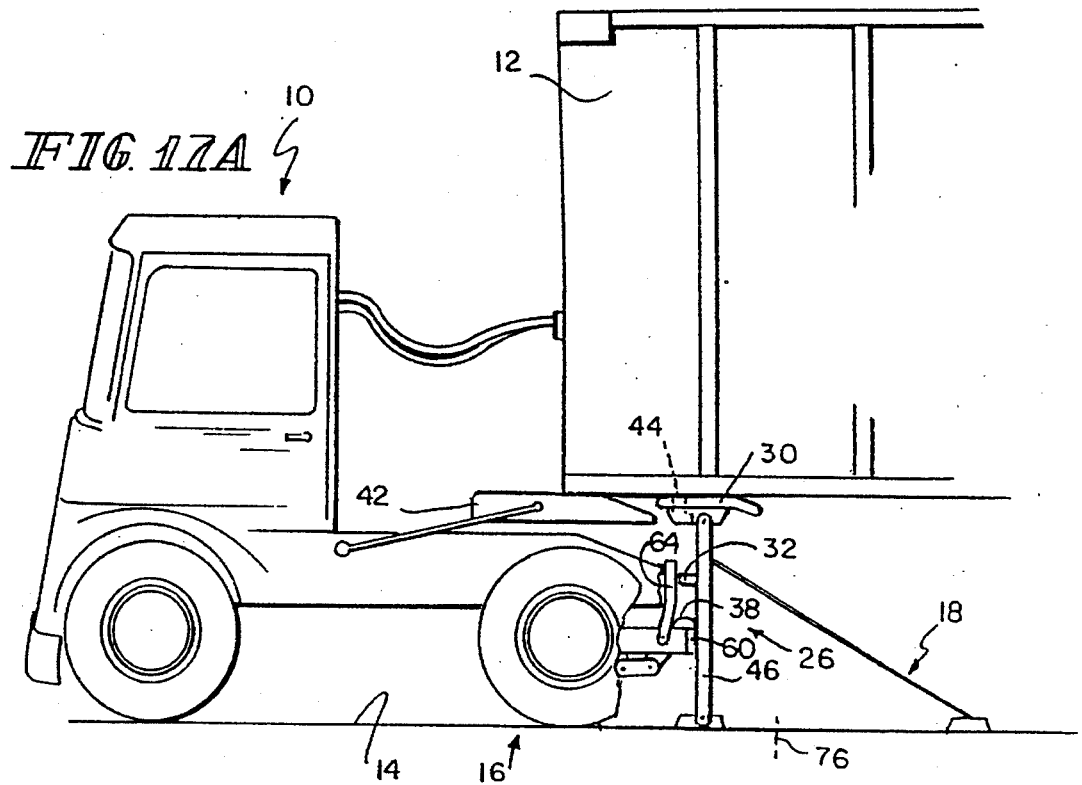

With the hook 38 properly engaged, the driver continues forward and observes that the hook 38 remains engaged and that the vertical strut 46 is pulled to the upright position as shown in FIGS. 17A and B. Since the movement of the tractor 10 erects the vertical strut 46, when this strut reaches its upright position, the hook 38 will no longer be able to move. Both the hook 38 and the tractor 10 will then be stopped abruptly. Care must be taken that tractor speed is low during this operation or the sudden stop of the tractor 10 could cause injury to the driver or damage to equipment. When the vertical strut 46 is erect and locked, the trigger 32 will be fully extended. The driver must, as shown in FIG. 17C, observe the trigger in the monitor to be certain that the stand 26 is locked up. If not locked, the stand 26 could collapse when the weight of the trailer 12 is imposed on it.

With the stand 26 properly erected under the trailer 12, the driver moves the fifth wheel elevation control to lower the trailer's threshold plate 42 to the top plate 30 of the stanchion 18. The driver next moves the hook control switch to the "RAISE" position and backs the tractor 10 slightly to relieve tension on the hook 38. This will lift the hook 18 out of the receiver opening as shown in FIGS. 18A and B.

The driver next pulls ahead to the point where the fifth wheel 42 of the tractor 10 is partially out from under the trailer's threshold plate 30 but not so far forward as to strain the brake hoses. He then raises the fifth wheel 42 to a position above the level of the trailer threshold plate 30. The driver next backs against the trailer 12, releases the trailer brakes, and pushes the trailer 12 back with the elevated fifth wheel 42 until the trailer kingpin 44 engages the stanchion's top plate 30, tying the trailer 12 to the stanchion 18 and the deck of the train as shown in FIG. 19.

The driver then exhausts both brake hoses, steps out of the cab and physically disconnects the hoses from the trailer. The driver can then drive off the deck. Before doing so, however, he should enter the number of the stanchion just occupied into his calculator or on his work sheet as the new "Last Stanchion Used." While out of his cab the driver should again note that the stand 26 is properly locked in the erect position as indicated by the trigger 32 being fully extended. He should also see that the kingpin 44 is locked as shown by the pin indicator.

The removal process of the trailers from the train will be described with respect to FIGS. 20 through 23. The screen views have not been shown for this sequence since they are very similar to that shown in FIGS. 14B through 18B. The camera system is still used to verify the positioning and the relationship of the elements on the tractor, trailer and stand.

Figure 20:
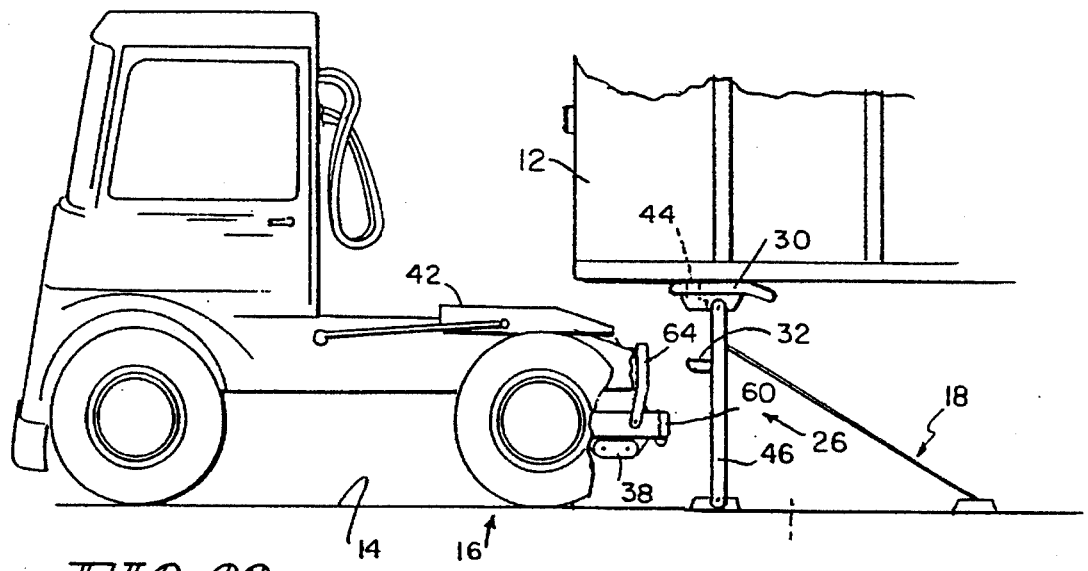
FIG. 20 through 23 are schematic representations of a method of unloading a trailer railroad car having fixed stanchions according to the principles of the present invention.

The operation begins with the trigger actuator control switch in the "SAFE" position, and the trigger actuator 64 fully retracted. With the tractor fifth wheel 42 in its lowest position, the driver backs the tractor 10 under the front of the trailer 12 as shown in FIG. 20.

Figure 21:
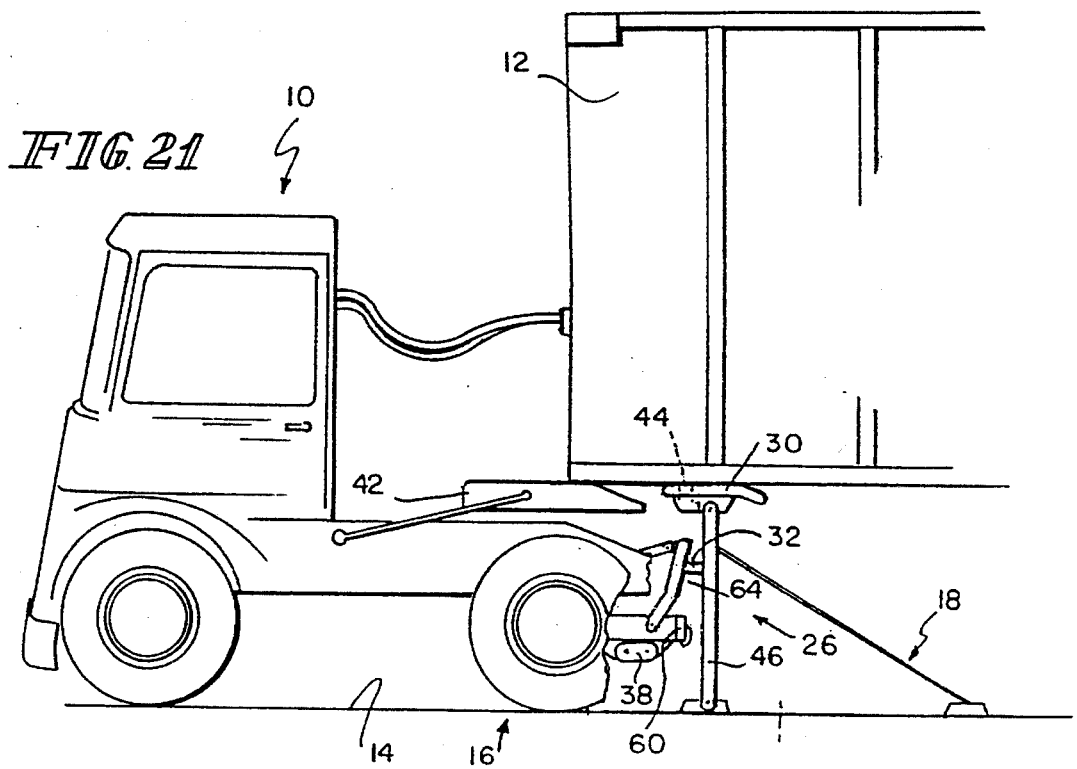
Figure 22:
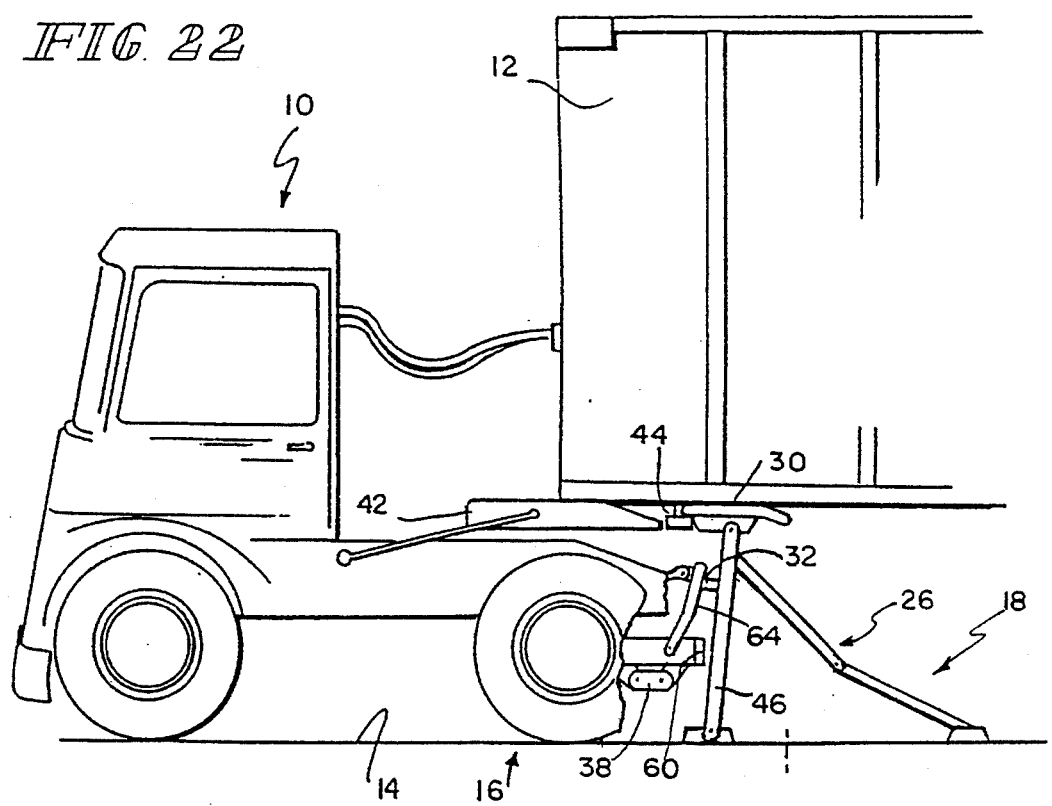
Figure 23:
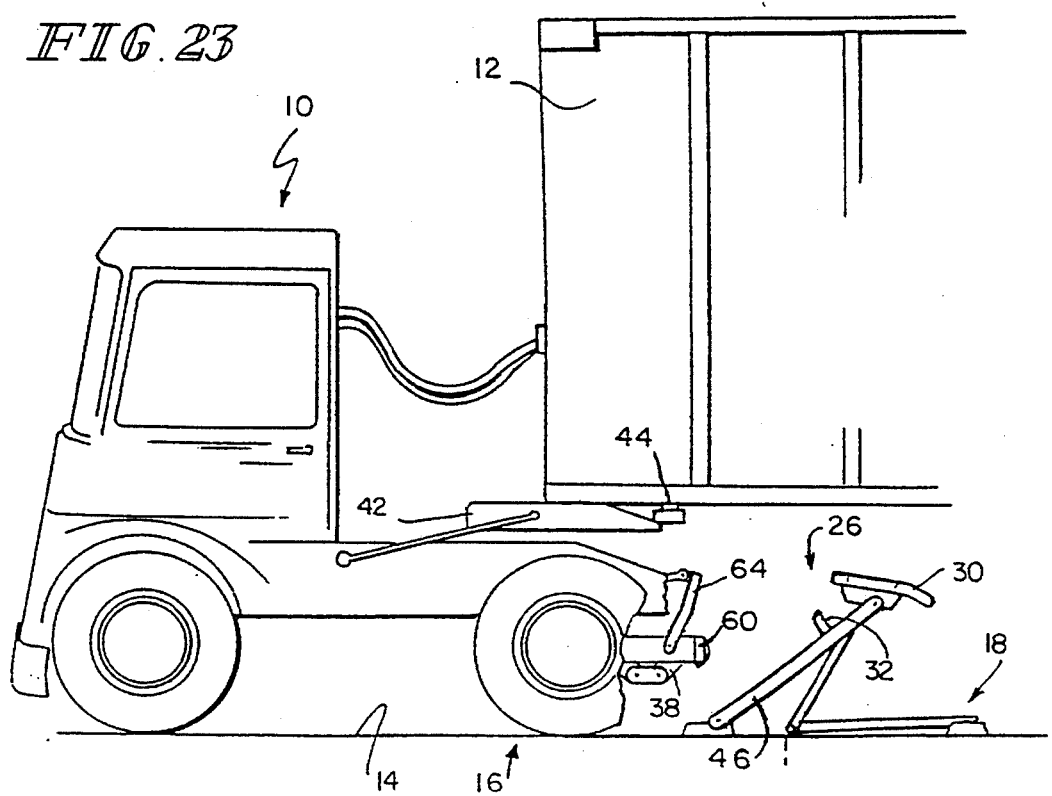

The driver next manipulates the fifth wheel elevation control to raise the fifth wheel 42 into contact with the threshold plate under the trailer, then gets out of the cab and connects the trailer air brake hoses. He then reenters the cab, applies the trailer brakes, and moves the trigger actuator control switch to the "KNOCKDOWN" position. With these operations complete, the tractor 10 and trailer 12 are located as shown in FIG. 13 and 21. After a moment of delay to allow the trigger actuator 64 to travel to its extended position, the driver backs the tractor 10 against the trigger 32 causing it to depress and in turn release the top plate 30 of the stanchion 18 from the kingpin 44 and fold the vertical strut 46 down, as shown in FIGS. 22 and 23.

With the stanchion 18 out of the way, as confirmed by the monitor, and the full weight of the trailer 12 borne by the tractor 10, the driver backs further to couple the fifth wheel 42 with the trailer kingpin 44 and apply forward motion against the still applied trailer brakes to test the coupling. The driver should then move the trigger actuator control switch to the "SAFE" position.

As can be seen from the method of the loading and unloading of FIGS. 1–9 and 14–23, the interaction between the tractor 10 and the stanchion 18 allows the stanchion to be positioned and repositioned with the loading and unloading of the trailer 12, as well as being raised and lowered in its appropriate position. This is all accomplished from the tractor 10 by a single operator. Also, the stanchion 18 and the trailers 12 may be positioned anywhere along the surface of the car 16. This allows closer positioning of the trailers relative to each other, thereby reducing wind resistance and making more efficient loading. The unique latch mechanism and its cooperation with the gate and hook on the tractor provides the versatility of the present system for movable stanchions.

The use of an optical system allows the operator to monitor the relationship of the tractor and its actuators and implements, the trailer and its position and interconnection to the stanchion, and the position and condition of the stanchion. In combination with the unique position indicia, this allows an efficient and safe operation. A trigger actuator, having a safe and unlocking position, allows control of the trigger to unlock the stand without relying on the position of the trailer to the stanchion. This independent control prevents inadvertent actuation of the unlocking mechanism for the stand if the trailer should bump into the stanchion. The optical system has been shown as using a video camera 70 and a monitor, but maybe any other optical system for example, mirrors.

Thus, a complete operation and methods of loading and unloading can be conducted by a single operator of the tractor. Other than leaving the cab (but staying on the tractor) to connect and disconnect the brake systems of the tractor 10 and the trailer 12, the operator can load and unload the trailer 12 as well as position, reposition, raise and lower the stanchion 18 all from the cabin of the tractor 10.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. A system for positioning and supporting trailers on a railroad car with a tractor, comprising:

stanchion means, on a railroad car and having lowered and raised positions, for receiving and securing a trailer when raised;

said stanchion means including lock means for locking said stanchion means in said raised position and trigger means for unlocking said lock means;

actuator means on a tractor for interacting with and controlling the raised and lowered position of said stanchion means when said tractor is adjacent said stanchion means; and optical means on said tractor for allowing an operator in a cab of said tractor to monitor the relationship of said tractor, said trailer, said stanchion means and said actuator means and the condition of said trigger means.

2. A system according to claim 1, wherein said optical means includes a screen in said cab and a camera for providing images for said screen.

3. A system according to claim 1, wherein said optical means includes mirrors.

4. A system according to claim 1, wherein said actuator means includes an actuator having a safe position which does not engage said trigger means when said tractor is adjacent said stanchion means and an unlocking position which actuates said trigger means when said tractor is adjacent said stanchion means.

5. A system according to claim 4, wherein said actuator includes a fluid motor to move said actuator between said positions.

6. A system for positioning and supporting trailers on a railroad car with a tractor, comprising:

stanchion means, on a railroad car and having lowered and raised positions, for receiving and securing a trailer when raised;

lock means for locking said stanchion means in said raised position;

trigger means for unlocking said lock means;

hook means on said tractor for engaging said stanchion means when said tractor is adjacent said stanchion means and allowing raising of said stanchion means; and actuator means on a tractor having a safe position which does not engage said trigger means when said tractor is adjacent said stanchion means and an unlocking position which actuates said trigger means when said tractor is adjacent said stanchion means.

7. A system according to claim 6, wherein said actuator means includes a fluid motor to move said actuator means between said positions.

8. A system according to claim 6, including a bumper on said trailer for engaging said stanchion means when said tractor is adjacent said stanchion means; and wherein said actuator means' safe position is behind said bumper and said actuator means' unlocking positions is at said bumper.

9. A system according to claim 8, wherein said actuator means is pivotally mounted to said bumper.

10. A system according to claim 8, wherein said bumper is a pair of spaced bumpers and said hook means is between said pair of bumpers.

11. A system for positioning and supporting trailers on a railroad car with a tractor, comprising:

stanchion means, on a railroad car and having lowered and raised positions, for receiving and securing a trailer when raised;

actuator means on a tractor for interacting with and controlling the raised and lowered position of said stanchion means when said tractor is adjacent said stanchion means;

said actuator means including hook means for engaging said stanchion means when said tractor is adjacent said stanchion means, and hook operator means for moving said hook means between engage and disengage positions;

said stanchion means including receiving means for receiving said hook means; and optical means on said tractor for allowing an operator in a cab of said tractor to monitor the relationship of said tractor, said trailer, said stanchion means and said actuator means and the position of said hook means with respect to said receiving means.

12. A system according to claim 11, wherein: said stanchion means includes indicium spaced from said receiving means for indicating the minimum spacing from said receiving means at which said hook means should be moved from its disengaged to its engaged position; and
said optical means allows said operator in said cab to monitor the position of said hook means with respect to said indicia and said receiving means.

* * * * *